(12) United States Patent
Copeland

(10) Patent No.: US 9,435,390 B2
(45) Date of Patent: Sep. 6, 2016

(54) LIMITING TORQUE CLUTCH IN AN INPUT DAMPER

(71) Applicant: Allison Transmission, Inc., Indianapolis, IN (US)

(72) Inventor: Kevin A. Copeland, Greenwood, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 49 days.

(21) Appl. No.: 14/532,130

(22) Filed: Nov. 4, 2014

(65) Prior Publication Data

US 2015/0053528 A1    Feb. 26, 2015

Related U.S. Application Data

(63) Continuation of application No. 13/678,590, filed on Nov. 16, 2012, now Pat. No. 8,939,843.

(51) Int. Cl.
| | |
|---|---|
| *F16D 3/10* | (2006.01) |
| *F16D 3/14* | (2006.01) |
| *F16D 13/22* | (2006.01) |
| *F16D 13/38* | (2006.01) |
| *F16F 15/129* | (2006.01) |
| *F16D 65/00* | (2006.01) |
| *F16F 15/123* | (2006.01) |
| *F16F 15/00* | (2006.01) |
| *F16D 43/21* | (2006.01) |
| *F16D 23/12* | (2006.01) |

(52) U.S. Cl.
CPC ............ *F16D 65/0006* (2013.01); *F16D 3/10* (2013.01); *F16D 13/22* (2013.01); *F16D 13/38* (2013.01); *F16F 15/00* (2013.01); *F16F 15/129* (2013.01); *F16F 15/1297* (2013.01); *F16F 15/12373* (2013.01); *F16D 43/215* (2013.01); *F16D 2023/123* (2013.01)

(58) Field of Classification Search
CPC ..... F16F 15/1297; F16F 15/129; F16D 3/14; F16D 7/025; F16D 47/02; F16D 3/10; F16D 2023/123
See application file for complete search history.

(56) References Cited

U.S. PATENT DOCUMENTS

| | | |
|---|---|---|
| 1,739,947 A | 12/1929 | Chilton |
| 3,511,349 A | 5/1970 | Herscovici |
| 4,440,283 A | 4/1984 | Nioloux |

(Continued)

OTHER PUBLICATIONS

"International Search Report" and the "Written Opinion of the International Searching Authority", Dated Mar. 28, 2013, 9 pages.

*Primary Examiner* — Jacob S Scott
*Assistant Examiner* — Tinh Dang
(74) *Attorney, Agent, or Firm* — Taft Stettinius & Hollister LLP; Stephen F. Rost

(57) ABSTRACT

The present disclosure provides an input damper for coupling to a torque-generating mechanism. The damper includes an outer cover, a hub, and a carrier assembly coupled to the hub. The carrier assembly is movably disposed within the cover. A clutch assembly moves between an engaged position and a disengaged position. The input damper further includes an angular displacement mechanism operably coupled to the clutch assembly for moving the clutch assembly between the engaged position and disengaged position. A damper spring is disposed between the outer cover and the clutch assembly. The outer cover is coupled to the carrier assembly in the engaged position.

16 Claims, 9 Drawing Sheets

(56) References Cited

U.S. PATENT DOCUMENTS

| | | |
|---|---|---|
| 4,572,342 A | 2/1986 | Weiss et al. |
| 4,583,959 A | 4/1986 | Yoneda |
| 4,790,419 A | 12/1988 | Loizeau |
| 4,856,638 A | 8/1989 | Roth et al. |
| 5,382,193 A | 1/1995 | Friedman et al. |
| 5,496,154 A | 3/1996 | Hall, III et al. |
| 5,526,714 A | 6/1996 | Schierling |
| 5,617,939 A * | 4/1997 | Memmel ............ F16F 15/1207 192/204 |
| 8,105,171 B2 | 1/2012 | Murakami |
| 2011/0263340 A1 | 10/2011 | Degler |

\* cited by examiner

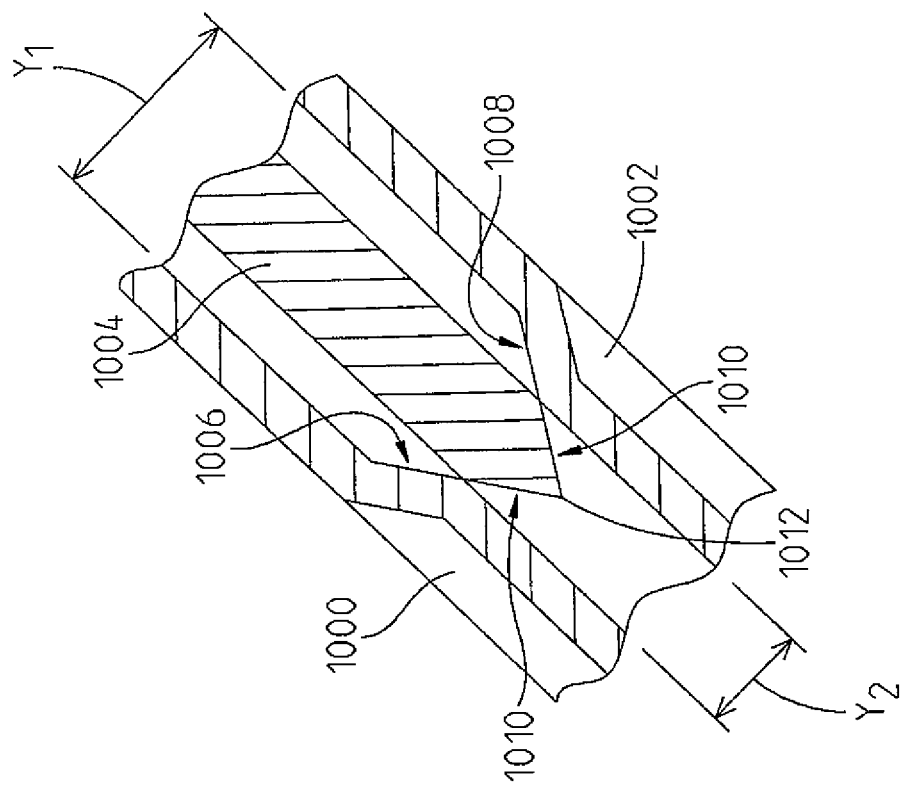
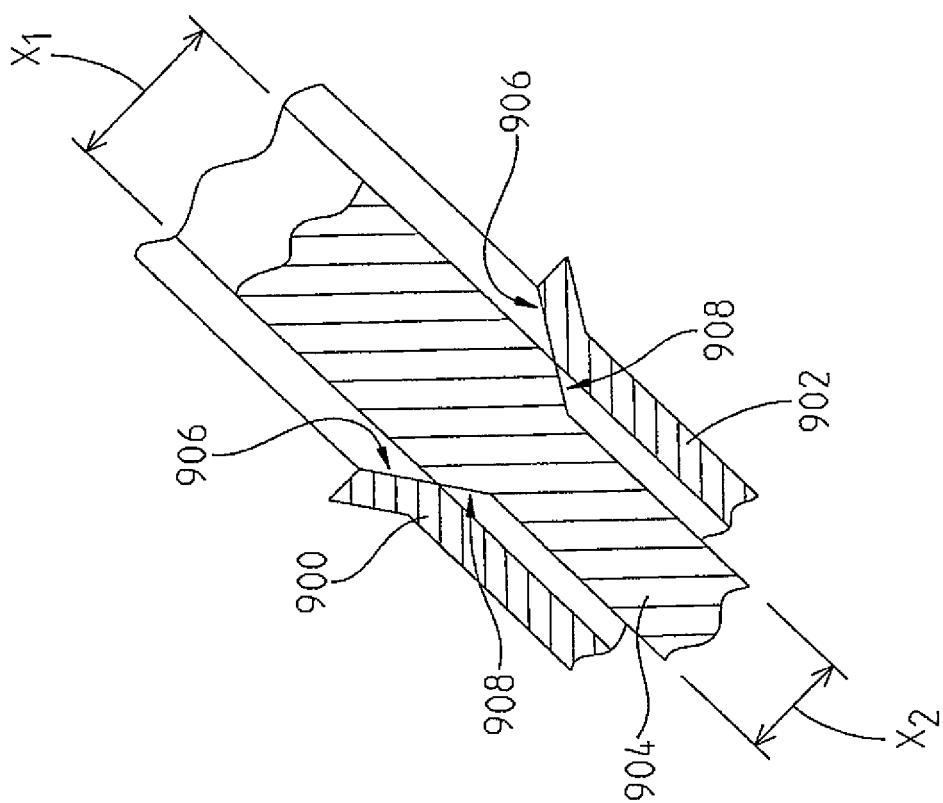
Fig. 10
Fig. 9

LIMITING TORQUE CLUTCH IN AN INPUT DAMPER

RELATED APPLICATIONS

This application is a continuation of U.S. patent application Ser. No. 13/678,590, filed Nov. 16, 2012, which claims the benefit of U.S. Provisional Patent Application Ser. No. 61/560,336, filed Nov. 16, 2011, which are hereby incorporated by reference in their entirety.

FIELD OF THE DISCLOSURE

The present disclosure relates to an input damper, and in particular, to a limiting torque clutch for decoupling at a full damper capacity.

BACKGROUND

In a powered vehicle having an engine, the engine can have problems that cause extreme torque spikes. One such engine problem would be coolant released into the engine's intake thereby immediately stopping the engine. The immediate stop can cause a significant torque spike to pass through an input shaft of a transmission coupled to the engine. In some instances, the input shaft can be fractured or damaged due to the torque spike. Alternatively, in an engine and transmission system, the natural frequency of the system can cause high torque spikes. These extreme torque spikes can also cause damage to the transmission.

To reduce or prevent this damage from torque spikes, an input damper can be connected between the engine and input shaft of the transmission. During normal engine operation, a conventional input damper can "dampen" or reduce the torque spike or torsional so that a substantially constant amount of torque is transferred to the input shaft. To do so, the conventional input damper can include a plurality of springs and stops such that rotational energy received by the input damper causes rotation or angular displacement of the springs. In other words, the springs are compressed to dampen the rotational energy (i.e., input torque). However, conventional input dampers have a limited capacity at which point the plurality of springs reach the end of their respective spring travel. In this instance, the input damper becomes a solid coupling between the torque-generating mechanism and the input shaft and undampened torque spikes can affect the input shaft and transmission.

To limit the torque spikes transmitted to the input shaft, torque-limiting clutches can be employed in conjunction with the conventional input damper. Conventional torque-limiting clutches can have a wide range of capacities due to tolerance stacks. In one aspect, a conventional input damper can be designed in conjunction with a torque-limiting clutch at or near the maximum capacity of the input damper. The clutch may slip before full capacity or, alternatively, reach the full capacity at which point an extreme torque spike is fully transferred to the input shaft.

Thus, a need exists for providing a means for preventing or reducing torque spikes and other torsional impact from exceeding the capacity of the input damper.

SUMMARY

In an exemplary embodiment of the present disclosure, an input damper is provided for coupling to a torque-generating mechanism. The damper includes an outer cover, a hub, and a carrier assembly coupled to the hub. The carrier assembly is movably disposed within the cover. A clutch assembly moves between an engaged position and a disengaged position and is biased towards the engaged position. The input damper further includes an angular displacement mechanism operably coupled to the clutch assembly for moving the clutch assembly between the engaged position and disengaged position. The outer cover is coupled to the carrier assembly in the engaged position.

In one aspect, the clutch assembly comprises a backing plate, friction material, and a spring biasedly disposed against the backing plate. Moreover, the backing plate is coupled to the hub and the friction material can be coupled to the backing plate, hub or carrier assembly. In another aspect, the input damper includes a first backing plate having friction material disposed on a side thereof facing the carrier assembly and a second backing plate having friction material disposed on a side thereof facing the carrier assembly, where in the engaged position the friction material on the first and second backing plates is in contact with the carrier assembly and in the disengaged position the friction material on the first and second backing plates is not in contact with the carrier assembly.

In a different aspect, the clutch assembly comprises a backing plate, a flange portion of the hub, friction material disposed on at least one of the backing plate and flange portion, and a spring biasedly disposed against the backing plate. In a further aspect, the input damper includes a plurality of damper springs disposed in the outer cover. In addition, the outer cover comprises a first shell and a second shell, where at least one of the first shell and second shell is coupled to the angular displacement mechanism.

In one form of this embodiment, the angular displacement mechanism comprises a first portion and a second portion, the first portion being disposed on the cover and the second portion being disposed on the carrier assembly. Related thereto, the first portion is an angled surface of the cover and the second portion is a ramp defined in the carrier assembly, where contact between the angled surface and ramp induces a movement of the clutch assembly from the engaged position to the disengaged position. In another form thereof, the carrier assembly comprises a first thickness and a second thickness, the first thickness being greater than the second thickness, and the ramp is defined between the first thickness and second thickness. In a different form thereof, the cover comprises a first width and a second width, the first width being greater than the second width, and the angled surface is defined between the first width and second width.

In yet another aspect, the angular displacement mechanism comprises a ramp defined along a surface of the outer cover and a wedging mechanism disposed between the outer cover and carrier assembly, the wedging mechanism being movable relative to the ramp. Here, the clutch assembly is in the engaged position when the wedging mechanism is not in contact with the ramp, and the clutch assembly is in the disengaged position when the wedging mechanism is in contact with the ramp. Moreover, the wedging mechanism can include a pin, a roller, a ball, or an angled surface.

In a different embodiment, an input damper includes an outer cover having a first shell and a second shell, a hub, and a carrier assembly coupled to the hub, where the carrier assembly is at least partially disposed in the outer cover and adapted to move relative to one of the first shell and second shell. The input damper includes a clutch assembly having an engaged position and a disengaged position, the clutch assembly including a backing plate coupled to the hub, where friction material disposed on the backing plate is in contact with the carrier assembly in the engaged position. In addition, the input damper includes an angular displacement mechanism operably coupled to the clutch assembly for moving the clutch assembly between the engaged position and disengaged position, where the outer cover is coupled to the carrier assembly in the engaged position.

In one aspect of this embodiment, the clutch assembly comprises a spring biasedly disposed against the backing plate. In another aspect, the angular displacement mechanism comprises a first portion and a second portion, the first portion being disposed on the cover and the second portion being disposed on the carrier assembly. Moreover, the first portion is an angled surface of the cover and the second portion is a ramp defined in the carrier assembly, where contact between the angled surface and ramp induces a movement of the clutch assembly from the engaged position to the disengaged position. In a different aspect, the angular displacement mechanism comprises a ramp defined along a surface of the outer cover and a wedging mechanism disposed between the outer cover and carrier assembly, where the wedging mechanism is movable relative to the ramp. Here, the clutch assembly is in the engaged position when the wedging mechanism is not in contact with the ramp, and the clutch assembly is in the disengaged position when the wedging mechanism is in contact with the ramp. Related thereto, the wedging mechanism can include a pin, a roller, a ball, or an angled surface.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 9 is a schematic of a rear cover and carrier of an input damper;

FIG. 10 is a schematic of another rear cover and carrier of an input damper;

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
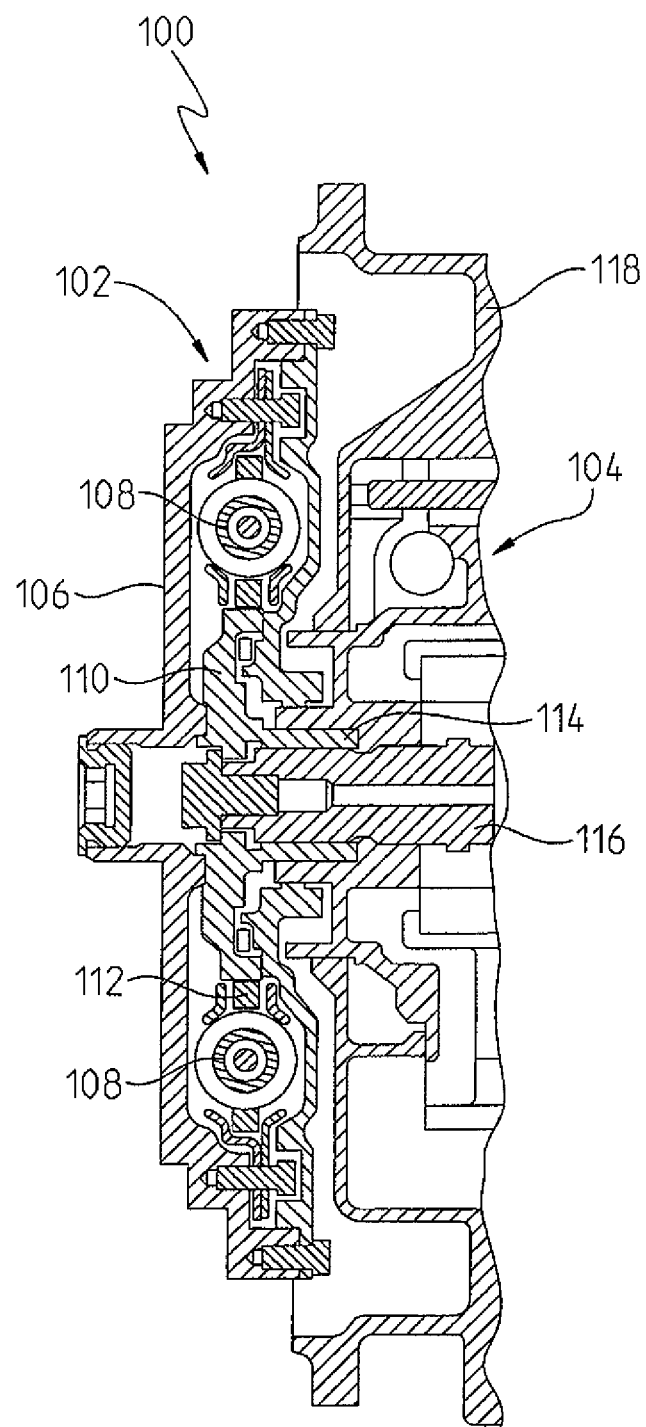
FIG. 1 is a partial cross-sectional view of a transmission assembly including an input damper.

Referring to FIG. 1 of the present disclosure, a transmission system 100 is shown. The system 100 can include a transmission 104 having an input shaft 116 and a rotating drive assembly 102. In this embodiment, the rotating drive assembly comprises an input damper 102 but is not limited thereto. The transmission 104 includes an outer housing 118, as shown. Although not shown, the input damper 102 can directly couple to a torque-generating mechanism (not shown) such as an engine or motor. Alternatively, the input damper 102 can be part of a torque converter, for example. In operation, the torque-generating mechanism is mounted to the input damper 102, and the input damper 102 is splined to the input shaft 116. As such, as the torque-generating mechanism drives the input shaft 116, torque spikes can be effectively reduced or dampened by the input damper 102.

The input damper 102 can include an outer cover 106 that is coupled to the torque-generating mechanism. The cover 106 encloses a plurality of damper springs 108 that are radially disposed about the input damper 102. Each spring 108 can be disposed between a stop (not shown) and a carrier 112. As torque spikes pass through the input damper 102, the plurality of springs 108 compress to dampen the torque load.

The input damper 102 can further include a hub 110 which includes splines 114 for coupling to the input shaft 116. In the event an extreme torque spike is transferred to the input damper 102, the plurality of springs 108 compress between the carrier 112 and each respective stop (not shown). If the torque spike reaches a level at or above the torque capacity of the input damper 102, the input damper 102 can achieve a solid connection between the torque-generating mechanism and input shaft 116 such that the torque is transferred to the shaft 116 and transmission 104. Various embodiments of the present disclosure can provide a torque-limiting clutch incorporated within the input damper 102 of FIG. 1 which can be applied or unapplied based on the amount of torque transferred to the input damper that produces an angular displacement.

Figure 2:
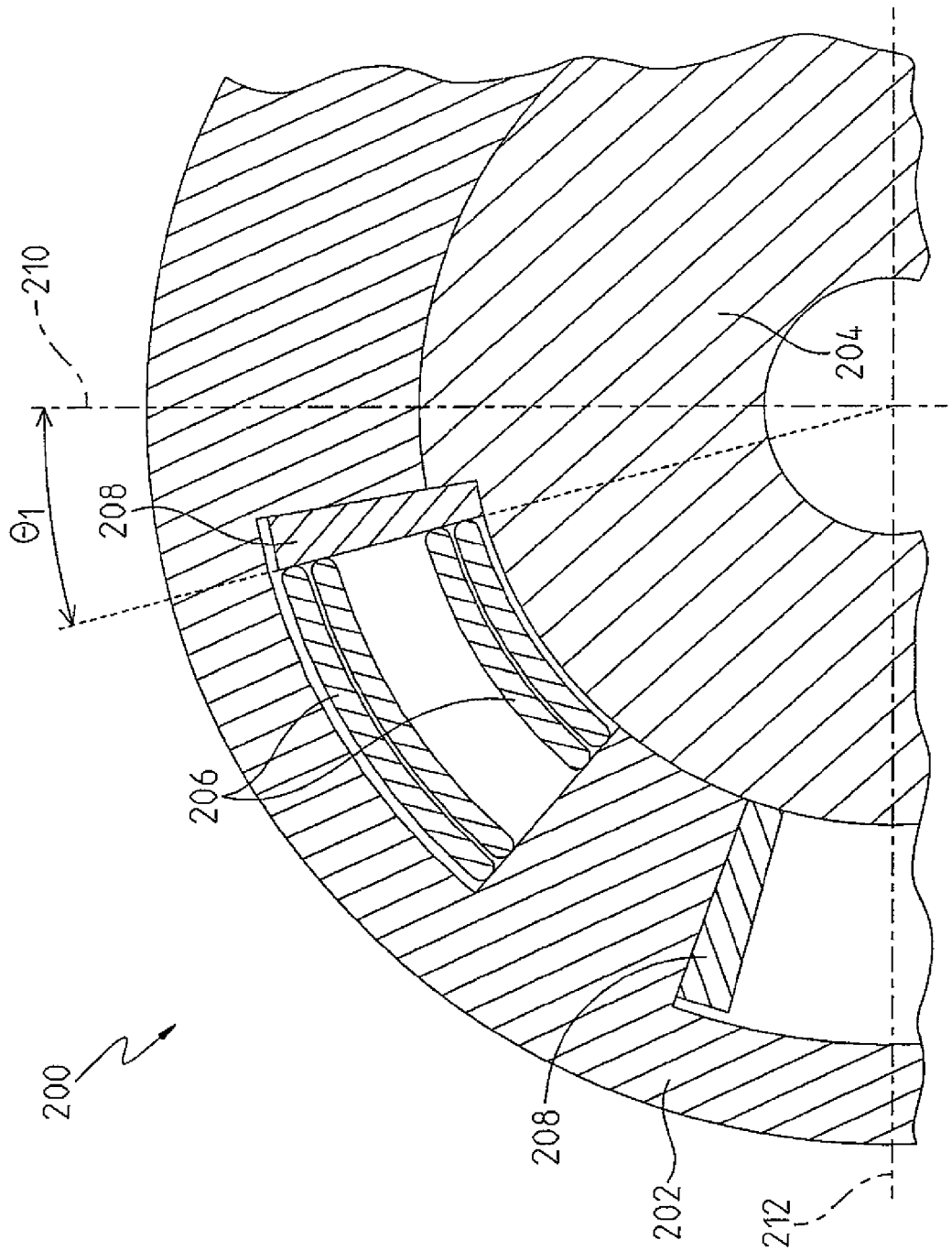
FIG. 2 is a partial cross-sectional view of a first embodiment of an input damper with an applied torque-limiting clutch.
Figure 5:
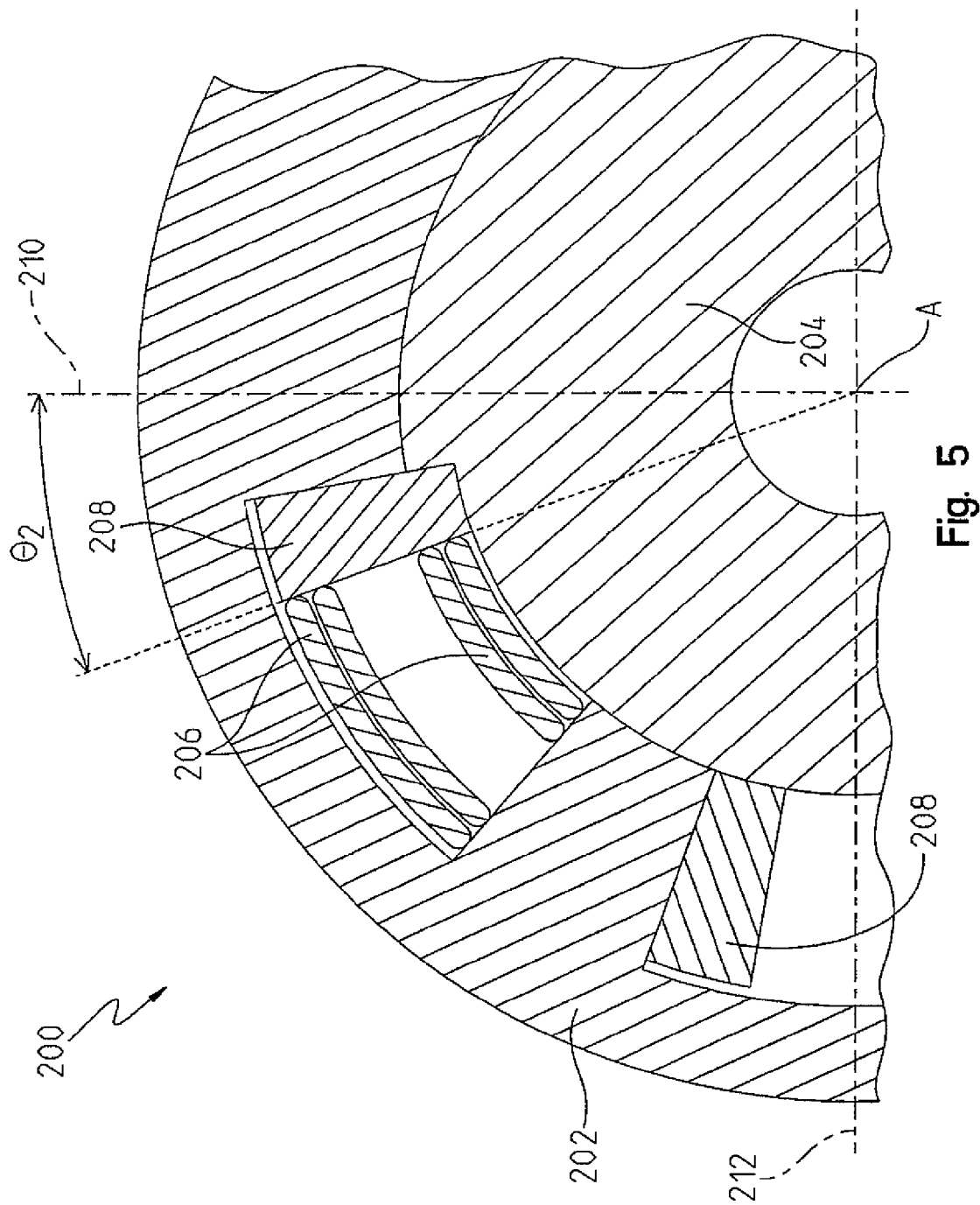
FIG. 5 is a partial cross-sectional view of the input damper of FIG. 2 with an unapplied torque-limiting clutch.

An exemplary embodiment of an input damper 200 with improved torque-limiting control is shown in FIGS. 2 and 5. The input damper 200 can have a cover 202 that defines an internal housing. The damper 200 further includes a plurality of damper springs 206 disposed radially about a center point A. The input damper is further shown with a horizontal axis 212 and a vertical axis 210 that intersect at the center point A. The input damper can further include a hub and backing plate assembly 204 and a carrier assembly 208. The carrier assembly 208 can be coupled or splined to the hub and backing plate assembly 204. The hub and backing plate assembly 204 can be coupled or splined to an input shaft of a transmission, for example.

In FIG. 2, the plurality of damper springs 206 are shown in an uncompressed state. In a different aspect, the damper springs can be compressed from the position shown in FIG. 2 by a first distance. Referring to FIG. 5, the plurality of damper springs 206 can be further compressed by a second distance, where the second distance is greater than the first distance. In other words, the embodiment of FIG. 2 shows the input damper in a low or zero torque condition in which the damper springs 206 are largely uncompressed, whereas in the embodiment of FIG. 5 the input damper is disposed in a higher torque condition in which the damper springs 206 are substantially compressed.

Stated in another manner, during operation the carrier 208 is driven clockwise and counterclockwise to compress and uncompress the plurality of damper springs 206. The rotational movement of the carrier 208, and thus compression of the plurality of damper springs 206, can result in an angular displacement of the carrier 208. The angular displacement is shown in FIGS. 2 and 5 as angle θ as defined between vertical axis 210 and the interface of the damper spring 206 and carrier 208. As shown in FIGS. 2 and 5, angle $\theta_1$ (FIG. 2) is smaller than angle $\theta_2$ (FIG. 5) thereby representing a change in angular position of the carrier 208 with respect to the vertical axis 210.

The change in angular displacement can be important for managing input torque spikes. Various embodiments of the present disclosure addressing the advantage of using angular displacement will now be described.

Figure 3:
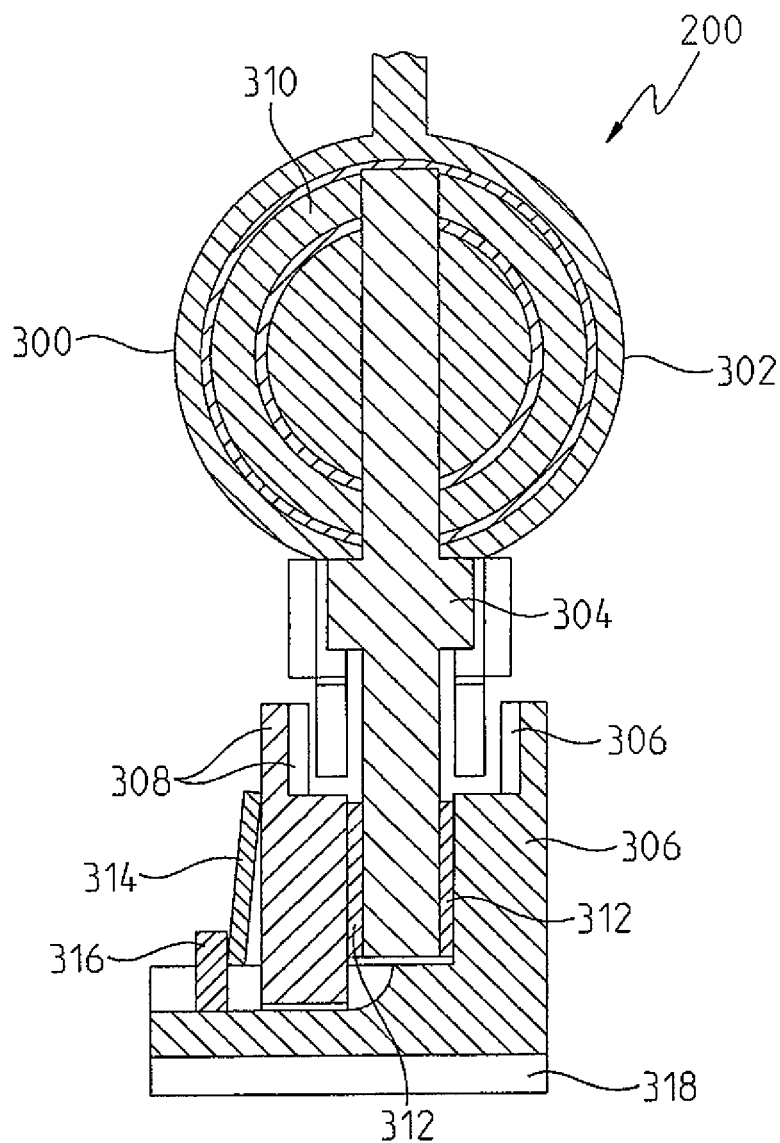
FIG. 3 is another partial cross-sectional view of the input damper of FIG. 2.
Figure 4:
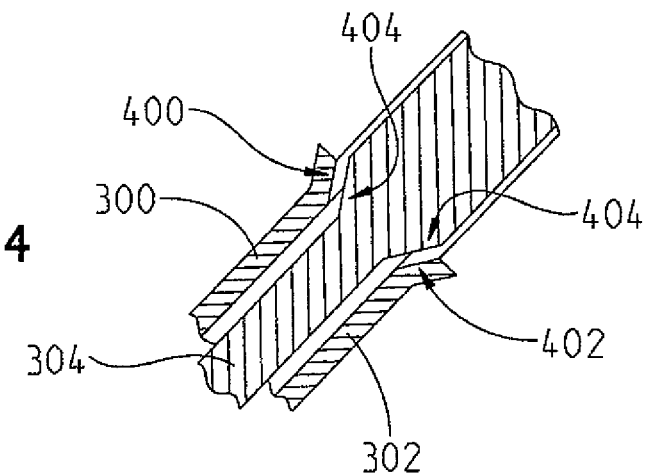
FIG. 4 is a schematic of a portion of the input damper of FIG. 3.

Referring to FIGS. 3-4, an input damper 200 is shown. The input damper 200 includes an outer housing formed by a first shell 300 and a second shell 302 coupled to one another. The input damper 200 can include a hub 306 with splines 318 for coupling to an input shaft (not shown) of a transmission, for example. Similar to the embodiments of FIGS. 2 and 5, the input damper 200 can also include a carrier 304 splined to the hub 306. The carrier 304 can be rotationally driven to compress a plurality of damper springs 310 to absorb or dampen torque spikes introduced to the input damper 200.

The input damper 200 also forms a torque-limiting clutch as shown in FIG. 3. The clutch is defined by a backing plate 308 and friction material 312 disposed on one surface of the backing plate and on an oppositely disposed surface of the hub 306. As shown in FIG. 3, the friction material 312 is arranged such that the backing plate 308 can be forced in a direction towards the carrier 304 to engage the friction material 312 with the carrier 304. A spring 314, such as a Belleville spring, is disposed on a side of the backing plate 308 opposite the friction material 312 and is held in position by a retaining ring 316. The retaining ring 316 is disposed within a groove of the hub 306 to maintain the spring 314 in a position between the retaining ring 316 and backing plate 308. The spring 314 can be disposed such that it biases or forces the backing plate 308 towards the carrier 304 to engage the friction material 312 with the carrier 304. When the clutch is engaged, e.g., the friction material 312 engages the carrier 304, torque transmitted through the input damper 200 is transferred to an input shaft of a transmission.

Referring to FIG. 4, the angular displacement of the carrier 304 can be used for releasing the clutch. As shown, the carrier 304 can include a pair of angled edges 404. Similarly, the first shell 300 and second shell 302 include defined ramps 400, 402, respectively. The ramps 400, 402 can be angled surfaces disposed along a radial path of travel of the carrier 304. In FIG. 4, the amount of torque transferred to the input damper 200 is below a defined capacity such that the plurality of damper springs 310 are not fully compressed by the carrier 304, or in the alternative, the damper springs 310 are not compressed at a distance such that the angled edges 404 of the carrier do not engage the ramps 400, 402 of the outer shells. With respect to FIGS. 2 and 5, the angular displacement, θ, of the carrier 304 therefore has not traveled far enough for the angled edges 404 thereof to engage the ramps 400, 402.

Figure 6:
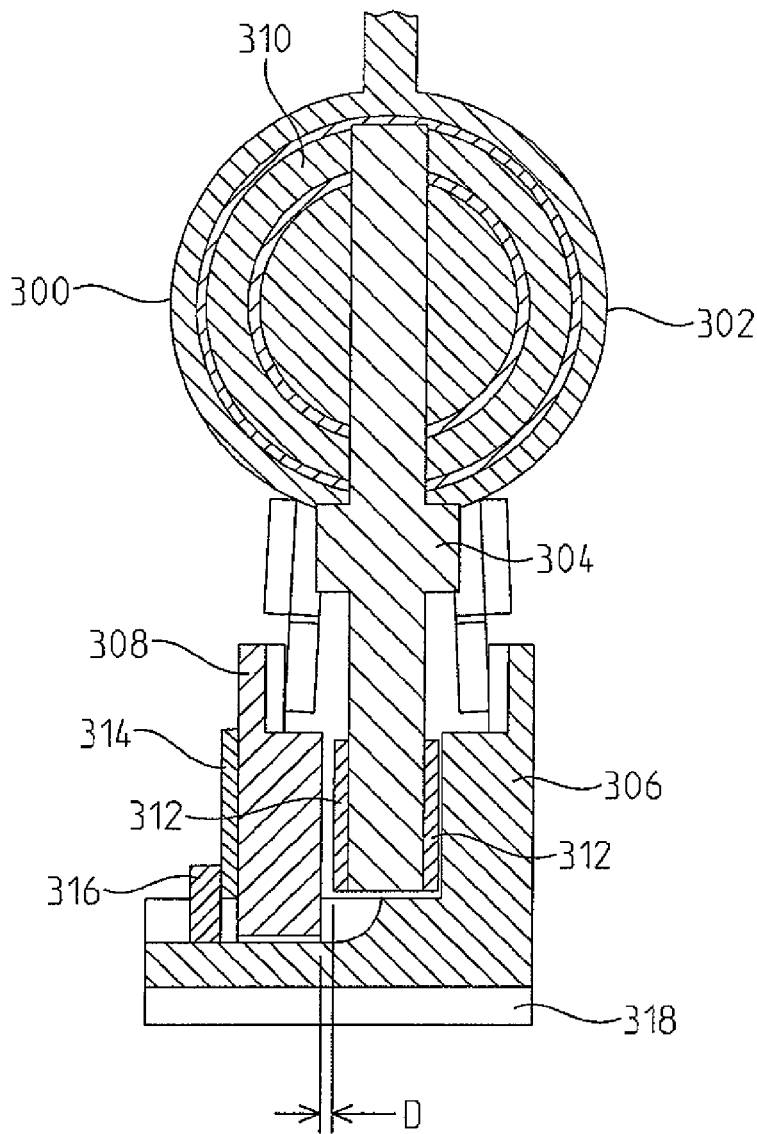
FIG. 6 is a partial cross-sectional view of the input damper of FIG. 5.
Figure 7:
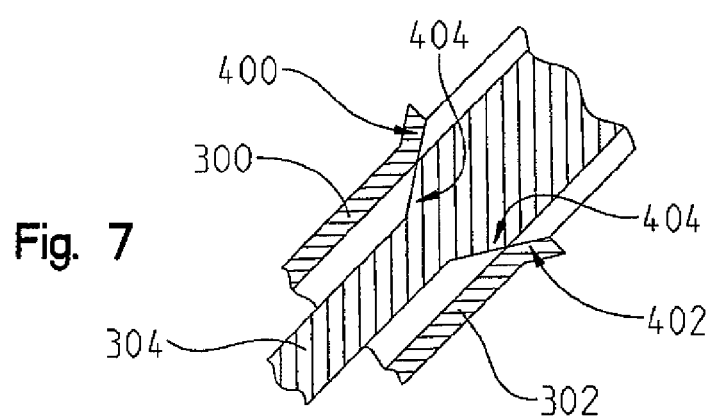
FIG. 7 is a schematic of a portion of the input damper of FIG. 6.

Referring to FIGS. 6 and 7, however, a different aspect of the present embodiment is shown. Here, a significant torque spike, for example, may be transferred to the input damper 200 to rotationally drive the carrier 304 an angular distance θ such that the angled edges 404 of the carrier 304 engage the ramps 400, 402 of the outer shells 300, 302, respectively. As the angled edges 404 engage the ramps 400, 402, the outer shells 300, 302 are forced away from one another. As such, the backing plate 308 can be pushed against the spring 314 and the friction material 312 disengages from the carrier 304. In this instance, torque cannot be transferred to the input shaft or transmission because there is no mechanical engagement or connection between the carrier 304, backing plate 308, and hub 306. Once the torsional energy is dissipated, i.e., the input torque falls below the torque capacity of the input damper 200, the spring 314 biases the backing plate 308 towards the carrier 304 to reengage the clutch. Likewise, the angular displacement of the carrier 304 returns to a position similar to FIG. 4 in which the angled edges 404 of the carrier 304 are removed from contacting the ramps 400, 402 of the outer shells 300, 302, respectively.

Figure 8:
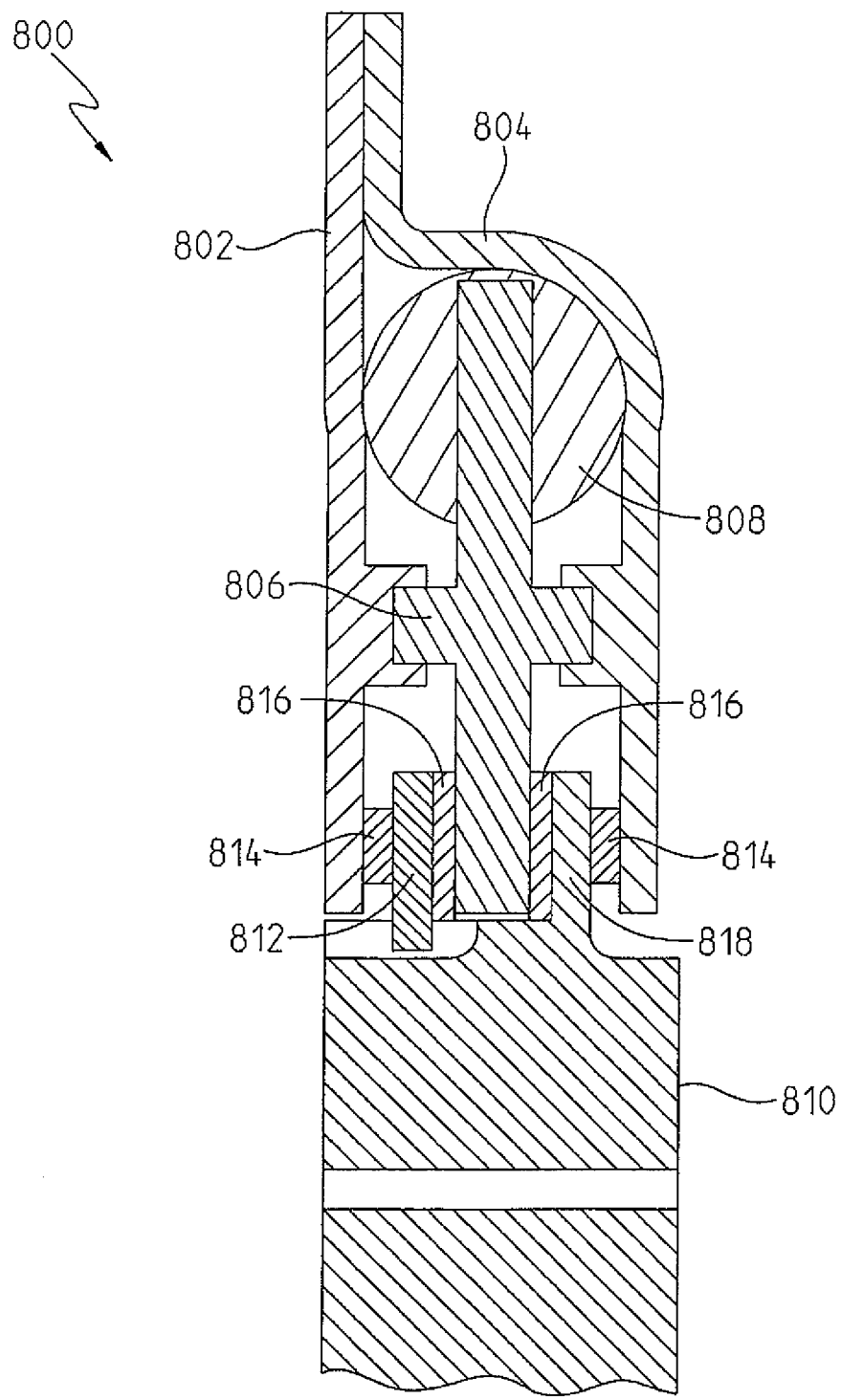
FIG. 8 is a partial cross-sectional view of another embodiment of an input damper.

In a different aspect of the present disclosure, an input damper 800 for coupling to an input shaft of a transmission is shown in FIG. 8. The input damper 800 can include a first shell 802 and a second shell 804, both of which can be coupled to one another to form an outer cover. The input damper 800 can further include a plurality of damper springs 808, a carrier assembly 806, and a drive hub 810. The drive hub 810 can be coupled to the input shaft (not shown) via splines. The embodiment of FIG. 8 further includes a backing plate 812 which can be splined to the drive hub 810 in an assembled configuration. The backing plate 812 is disposed between friction material 816 on one side and a bearing 814 on the opposite side thereof. The friction material 816 can be coupled to the backing plate 812 in this embodiment, although in other embodiments the friction material 816 may be coupled to the carrier assembly 806. The drive hub 810 can include a flange portion 818 which is similarly disposed between friction material 816 on one side and the bearing 814 on the opposite side thereof.

In this embodiment, a torque-limiting clutch is formed by the backing plate 812, friction material 816, flange portion 818, and carrier assembly 806. The clutch can be applied by the first shell 802 and second shell 804. In other words, the first shell 802 and second shell 804 can define a spring force therebetween to effectively bias the backing plate 812, friction material 816, and the carrier assembly 806 into contact with one another. Both shells 802, 804 can include ramps (not shown), similar to the illustrated embodiments of FIGS. 4 and 7. Likewise, the carrier assembly 806 can include ramps or angled edges (not shown) similar to the embodiments of FIGS. 4 and 7. As torque is transferred to the input damper 800, the first and second shells are biased toward one another to apply the torque-limiting clutch, and thereby mechanically engage the input damper 800 (and torque-generating mechanism such as an engine) to the input shaft. In other words, the carrier assembly 806 is biased into engagement with drive hub 810 (i.e., the flange portion 818) to mechanically couple the input damper 800 to the input shaft.

When a torque level exceeds a threshold or capacity of the input damper 800, the ramps of the carrier assembly 806 and outer shells 802, 804 engage to force or deflect the shells away from one another. As the first shell 802 and second shell 804 are mechanically forced away from one another, the backing plate 812 or carrier assembly 806 are disengaged from the friction material 816 to dissipate the torsional energy. Once the torsional energy is dissipated, and the torque level falls below the input damper capacity or threshold, the first shell 802 and second shell 804 are biased toward one another to reengage the torque-limiting clutch.

In the embodiments shown in FIGS. 4, 7, and 8, the outer shells of the input damper and the carrier assembly include ramped edges for engaging and disengaging the torque-limiting clutch based on the angular displacement, θ, of the carrier assembly. This design is similarly shown in FIG. 9 in which an outer cover includes a first outer shell 900 and a second outer shell 902. The first and second outer shells each include a defined ramp 906. Similarly, a carrier assembly 904 is provided which can move relative to the outer cover, and in particular, to the ramps 906. The carrier assembly 904 can have a defined thick portion $X_1$ and a thin portion $X_2$, where the change in thickness from $X_1$ to $X_2$ defines an angled edge 908.

In FIG. 10, a different embodiment is illustrated. In this embodiment, a carrier assembly 1004 has a defined thickness with a pointed end 1012. The intersection between the main body and pointed end 1012 defines angled or ramped edges 1010. A first outer shell 1000 and a second outer shell 1002 include a first portion with a defined width $Y_1$ and a second portion with a defined width $Y_2$, where the width $Y_1$ is greater than width $Y_2$. The intersection between widths $Y_1$ and $Y_2$ defines ramps 1006, 1008. The first outer shell 1000 and second outer shell 1002 can be biased towards one another, and then deflected away from one another as the edges 1010 of the carrier assembly 1004 engage ramps 1006, 1008 of the outer shells as the angular displacement changes due to an extreme torque spike.

Figure 11:
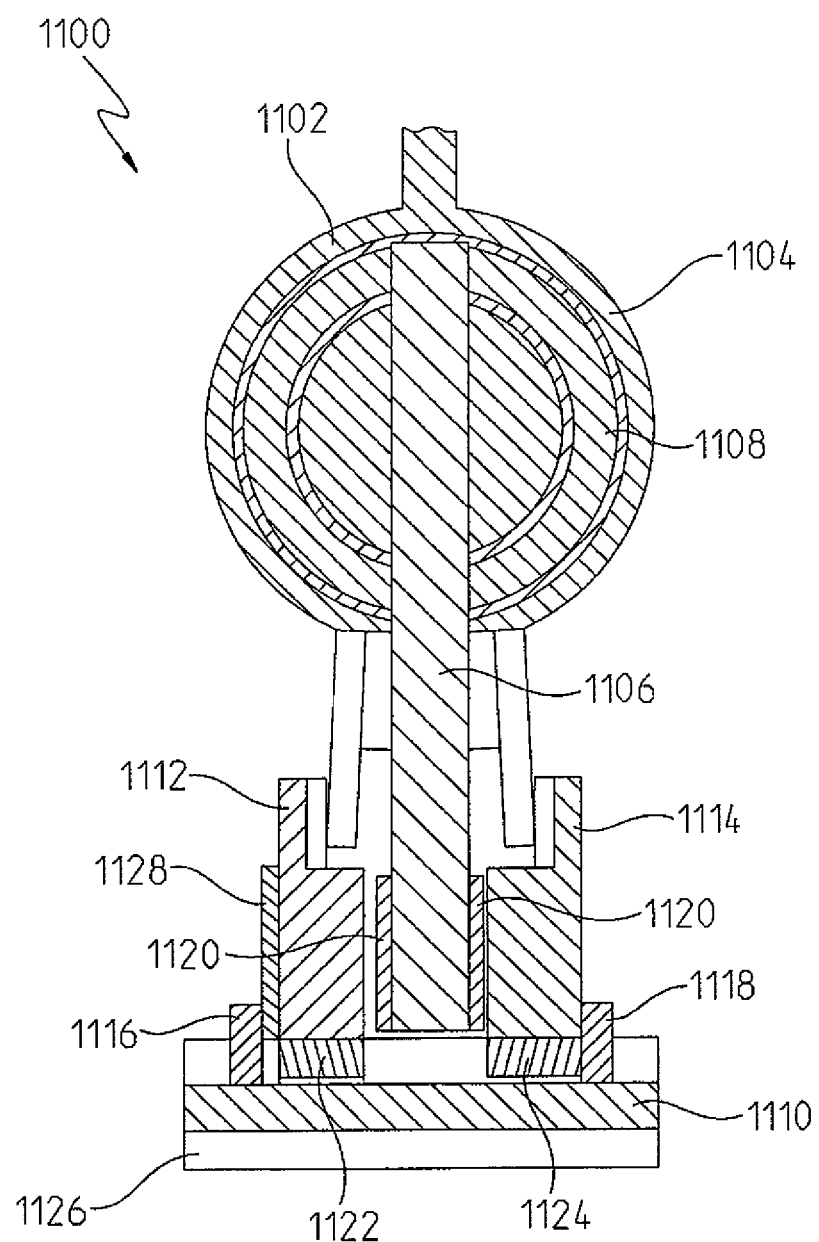
FIG. 11 is a partial cross-sectional view of a further embodiment of an input damper.

Another exemplary embodiment of an input damper 1100 is shown in FIG. 11. The input damper 1100 can include an outer cover formed by a first outer shell 1102 and second outer shell 1104. The input damper 1100 can also include a plurality of damper springs 1108 and a carrier assembly 1106. The carrier assembly 1106 can be mechanically coupled to a drive hub 1110 via a torque-limiting clutch. The clutch is formed by friction material 1120 disposed on a first backing plate 1112 and a second backing plate 1114. The first backing plate 1112 is positioned by a first retaining ring 1116 and the second backing plate 1114 is positioned by a second retaining ring 1118. Similar to the embodiments of FIGS. 3 and 6, a spring 1128 is disposed between the first retaining ring 1116 and first backing plate 1112. The spring 1128 can bias the first backing plate 1112 and friction material 1120 towards the carrier assembly 1106 to mechanically couple the carrier assembly 1106 to the drive hub 1110. The drive hub 1110 can be coupled to an input shaft of a transmission via splines 1126.

In this embodiment, the backing plates can form clutch rings with friction material to engage the carrier assembly 1106. The clutch rings can be replaceable, e.g., similar to brake pads, to improve the design of the input damper 1100. This is a simplified design compared to several of the previously described embodiments.

For engaging and disengaging the clutch, the first outer shell 1102 and second outer shell 1104 can include ramps similar to the embodiments of FIGS. 9 and 10. The carrier assembly 1106 can also include ramped edges like the embodiment of FIG. 9, or the carrier assembly 1106 can include a design similar to that of FIG. 10.

Figure 12:
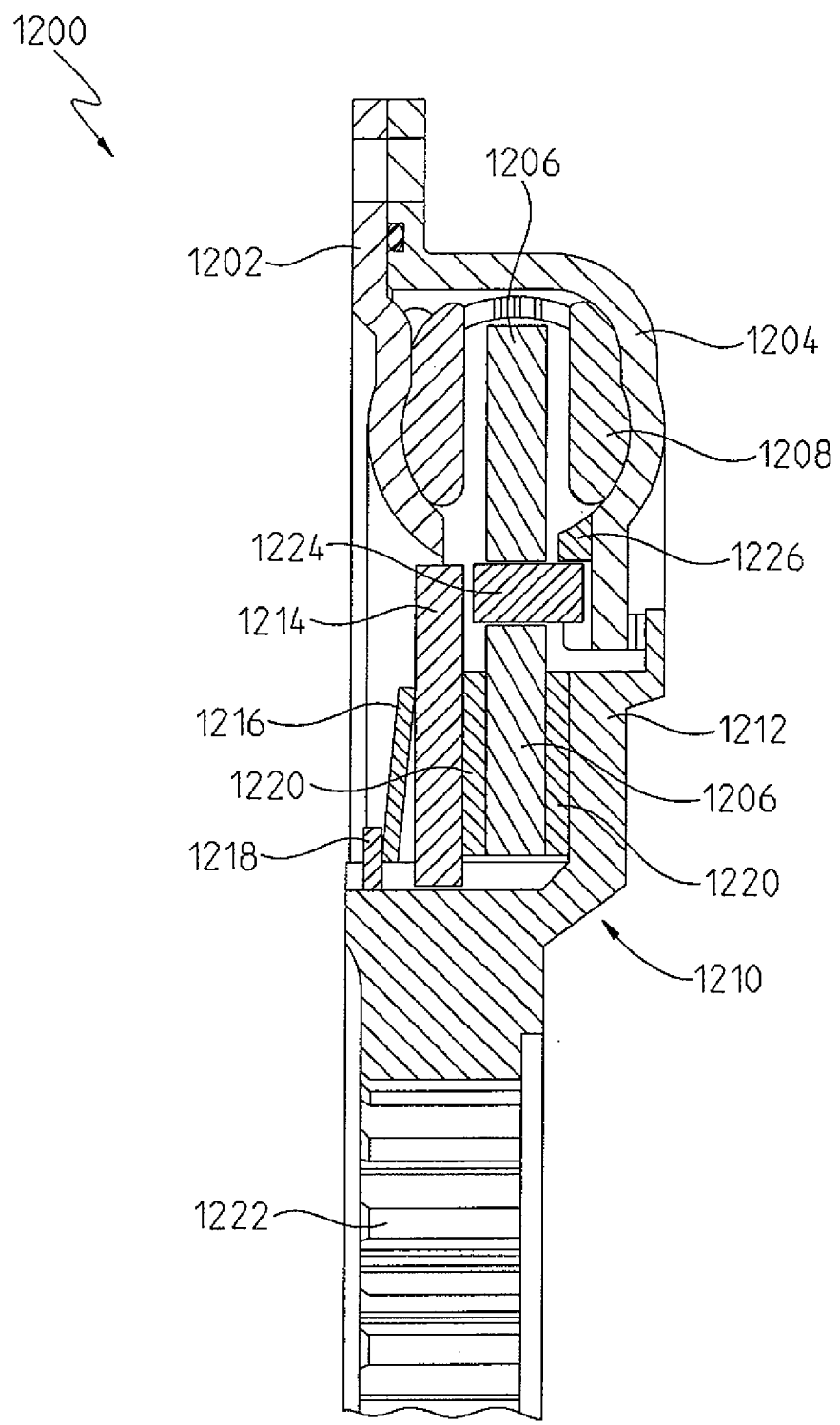
FIG. 12 is a partial cross-sectional view of a different embodiment of an input damper.

Referring to FIG. 12, a different embodiment of an input damper 1200 is shown. In this embodiment, the input damper 1200 includes an outer cover formed by a first outer shell 1202 and a second outer shell 1204 where the first and second outer shells are coupled to one another. The input damper 1200 further includes a carrier assembly 1206 and a plurality of stops 1208 which define the ends of spring travel of a plurality of damper springs (not shown). Similar to the embodiments of FIGS. 3 and 6, the input damper 1200 can include a drive hub 1210 with splines 1222 for coupling to an input shaft (not shown) of a transmission. The drive hub 1210 can include a flange 1212 which has an inner surface upon which friction material 1220 is disposed. In addition, a backing plate 1214 is provided having an inner surface upon which friction material 1220 is disposed oriented towards the carrier assembly 1206. The backing plate 1214, flange 1212 and friction material 1220 form a torque-limiting clutch for engaging the carrier assembly 1206 to transfer torque to the drive hub 1210.

A spring 1216, such as a Belleville spring, can also be disposed between the backing plate 1214 and a retaining ring 1218 to achieve a spring-loaded clutch. In other words, the spring 1216 biases the backing plate 1214 to engage the clutch and mechanically couple the carrier assembly 1206 to the drive hub 1210.

The input damper 1200 can further include a wedging mechanism 1224 in the form of a pin, roller, ball, or ramp formed in the outer shells and carrier assembly 1206. In FIG. 12, the second outer shell 1204 can include a ramp 1226 defined along its inner surface. In some embodiments, a ramp 1226 can also be defined in the first outer shell 1202. During operation, a significant torque spike can rotationally drive the carrier assembly 1206 to compress the plurality of damper springs (not shown). The damper springs can have a defined spring travel, and at a defined location along the travel the wedging mechanism 1224 can engage the ramp 1226. As the wedging mechanism 1224 engages the ramp 1226, the angular displacement has reached a point in which the wedging mechanism 1224 forces the backing plate 1214 away from the carrier assembly 1206. As this happens, the clutch begins to slip and the torsional energy is dissipated without being transferred to the drive hub 1210 and thereby the input shaft (not shown).

The wedging mechanism 1224 can be defined in the outer cover and carrier assembly 1206 to retain proper orientation after the torque-limiting clutch has slipped and is reapplied. The mechanism 1224 can be modified or defined to release the clutch at any desirable torque capacity. For example, the mechanism 1224 can be modified to release the clutch in the reverse direction for mechanisms that cannot have reverse torque inputs. This would require a different orientation of the wedging mechanism 1224 on the reverse torque side of the mechanism. Further, once the torsional energy into the input damper 1200 is reduced, the plurality of damper springs can provide the force to return the carrier assembly 1206 to a lower angular displacement so that the clutch is reapplied.

With respect to each of the embodiments in the present disclosure, the advantage of using angular displacement to prevent excess torque from possibly damaging an input shaft and transmission is the ability to effectively apply and unapply a torque-limiting clutch. In the event of engine failure, for example, an extreme torque spike can be transferred to the input damper causing the carrier assembly to substantially compress the damper springs. In conventional input dampers, the damper springs can be compressed such that a solid connection is achieved once the full capacity of the damper is reached, thereby transferring the torque spike to the input shaft and transmission. By designing a wedging mechanism, i.e., ramps, pins, balls, rollers, etc., into the outer cover and/or carrier assembly, a torque-limiting clutch can mechanically slip to prevent torsional energy from damaging the shaft and transmission.

In addition, some conventional input dampers can be designed such that a built-in clutch remains applied even once the damper reaches full capacity. However, in the present disclosure, the use of angular displacement, and in particular wedging mechanisms, the torque-limiting clutch is mechanically decoupled to prevent damage to the input shaft and transmission. Thus, a high clutch capacity can be designed such that it releases at the end of a damper stroke.

The present disclosure can be applicable to any rotating drive system. It can be incorporated in an automotive application with drive systems directly connected to an engine or other rotating power source. Hybrid drive systems with no torque converter or other engine disconnect mechanism can also be advantageously benefited by the embodiments of the present disclosure.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An input damper for coupling to a torque-generating mechanism, comprising:
   an outer cover;
   a hub having a plurality of splines configured to couple to an input shaft;
   a carrier assembly coupled to the hub, where the carrier assembly is movably disposed within the cover;
   a clutch assembly having an engaged position and a disengaged position, the clutch assembly being biased towards the engaged position;
   an angular displacement mechanism operably coupled to the clutch assembly for moving the clutch assembly between the engaged position and disengaged position; and
   a damper spring disposed in the outer cover and having a compressed position and an uncompressed position, where the damper spring is rotationally coupling the outer cover to the clutch assembly;
   wherein, when the clutch assembly is in the engaged position, the damper spring is in the uncompressed position and the outer cover is coupled to the carrier assembly;
   wherein the angular displacement mechanism comprises a first portion and a second portion, the first portion being disposed on the cover and the second portion being disposed on the carrier assembly;
   wherein the first portion is an angled surface of the cover and the second portion is a ramp defined in the carrier assembly, where contact between the angled surface and ramp induces a movement of the clutch assembly from the engaged position to the disengaged position.

2. The input damper of claim 1, wherein the clutch assembly comprises a backing plate, friction material, and a spring biasedly disposed against the backing plate.

3. The input damper of claim 2, wherein the backing plate is coupled to the hub.

4. The input damper of claim 2, wherein the friction material is coupled to the backing plate, hub or carrier assembly.

5. The input damper of claim 1, further comprising:
   a first backing plate having friction material disposed on a side thereof facing the carrier assembly; and
   a second backing plate having friction material disposed on a side thereof facing the carrier assembly;
   wherein, in the engaged position the friction material on the first and second backing plates is in contact with the carrier assembly and in the disengaged position the friction material on the first and second backing plates is not in contact with the carrier assembly.

6. The input damper of claim 1, wherein the clutch assembly comprises a backing plate, a flange portion of the hub, friction material disposed on at least one of the backing plate and flange portion, and a spring biasedly disposed against the backing plate.

7. The input damper of claim 1, further comprising more than one damper spring disposed in the outer cover.

8. The input damper of claim 1, wherein the outer cover comprises a first shell and a second shell, where at least one of the first shell and second shell is coupled to the angular displacement mechanism.

9. The input damper of claim 1, wherein:
   the carrier assembly comprises a first thickness and a second thickness, the first thickness being greater than the second thickness; and
   the ramp is defined between the first thickness and second thickness.

10. The input damper of claim 1, wherein:
    the cover comprises a first width and a second width, the first width being greater than the second width; and
    the angled surface is defined between the first width and second width.

11. An input damper for coupling to a torque-generating mechanism, comprising:
    an outer cover;
    a hub having a plurality of splines configured to couple to an input shaft;
    a carrier assembly coupled to the hub, where the carrier assembly is movably disposed within the cover;
    a clutch assembly having an engaged position and a disengaged position, the clutch assembly being biased towards the engaged position;
    an angular displacement mechanism operably coupled to the clutch assembly for moving the clutch assembly between the engaged position and disengaged position; and
    a damper spring disposed in the outer cover and having a compressed position and an uncompressed position, where the damper spring is rotationally coupling the outer cover to the clutch assembly;
    wherein, when the clutch assembly is in the engaged position, the damper spring is in the uncompressed position and the outer cover is coupled to the carrier assembly; and
    wherein the angular displacement mechanism comprises:
    a ramp defined along a surface of the outer cover; and
    a wedging mechanism disposed between the outer cover and carrier assembly, the wedging mechanism being movable relative to the ramp;
    wherein, the clutch assembly is in the engaged position when the wedging mechanism is not in contact with the ramp, and the clutch assembly is in the disengaged position when the wedging mechanism is in contact with the ramp.

12. The input damper of claim 11, wherein the wedging mechanism comprises a pin, a roller, a ball, or an angled surface.

13. An input damper, assembly, comprising:
an outer cover having a first shell and a second shell;
a hub;
a carrier assembly coupled to the hub, the carrier assembly being at least partially disposed in the outer cover and adapted to move relative to one of the first shell and second shell;
a clutch assembly having an engaged position and a disengaged position, the clutch assembly including a backing plate coupled to the hub, where friction material disposed on the backing plate is in contact with the carrier assembly in the engaged position;
an angular displacement mechanism operably coupled to the clutch assembly for moving the clutch assembly between the engaged position and the disengaged position; and
a damper spring disposed between the outer cover and the clutch assembly, where the damper spring has a compressed position and an uncompressed position;
wherein, when the damper spring is in the compressed position, the angular displacement mechanism moves the clutch assembly from the engaged position to the disengaged position and the outer cover is not coupled to the carrier assembly;
wherein the angular displacement mechanism comprises a first portion and a second portion, the first portion being disposed on the cover and the second portion being disposed on the carrier assembly; and
wherein the first portion is an angled surface of the cover and the second portion is a ramp defined in the carrier assembly, where contact between the angled surface and ramp induces a movement of the clutch assembly from the engaged position to the disengaged position.

14. The input damper assembly of claim 13, wherein the clutch assembly comprises a spring biasedly disposed against the backing plate.

15. An input damper assembly, comprising:
an outer cover having a first shell a second shell;
a hub;
a carrier assembly coupled to the hub, the carrier assembly being at least partially disposed in the outer cover and adapted to move relative to one of the first shell and second shell;
a clutch assembly having an engaged position and a disengaged position, the clutch assembly including a backing plate coupled to the hub, where friction material disposed on the backing plate is in contact with the carrier assembly in the engaged position;
an angular displacement mechanism operably coupled to the clutch assembly for moving the clutch assembly between the engaged position and the disengaged position; and
a damper spring disposed between the outer cover and the clutch assembly, where the damper spring has a compressed position and an uncompressed position;
wherein, when the damper spring is in the compressed position, the angular displacement mechanism moves the clutch assembly from the engaged position to the disengaged position and the outer cover is not coupled to the carrier assembly;
wherein the angular displacement mechanism comprises:
a ramp defined along a surface of the outer cover; and
a wedging mechanism disposed between the outer cover and carrier assembly, the wedging mechanism being movable relative to the ramp;
wherein, the clutch assembly is in the engaged position when the wedging mechanism is not in contact with the ramp, and the clutch assembly is in the disengaged position when the wedging mechanism is in contact with the ramp.

16. The input damper assembly of claim 15, wherein the wedging mechanism comprises a pin, a roller, a ball, or an angled surface.

* * * * *